United States Patent

Canale

[11] 3,907,466
[45] Sept. 23, 1975

[54] ROTARY COMBUSTION ENGINE OIL SEAL
[75] Inventor: Raymond P. Canale, Warren, Mich.
[73] Assignee: General Motors Corporation, Detroit, Mich.
[22] Filed: Sept. 3, 1974
[21] Appl. No.: 502,642

[52] U.S. Cl. .................... 418/75; 418/142
[51] Int. Cl.² .................................... F01C 19/08
[58] Field of Search .......... 418/75, 79, 80, 81, 142, 418/61 A

[56] References Cited
UNITED STATES PATENTS
| | | | |
|---|---|---|---|
| 2,979,042 | 4/1961 | Bentele | 418/142 X |
| 3,540,815 | 11/1970 | Belzner | 418/61 A |
| 3,849,038 | 11/1974 | Kurio | 418/142 |

Primary Examiner—C. J. Husar
Assistant Examiner—Leonard E. Smith
Attorney, Agent, or Firm—Charles R. Engle

[57] ABSTRACT

A side inlet port in an engine housing side wall is continuously connected to a rotor cavity formed by side mounted gas seals and an oil seal to maintain a continuous pressure differential across the oil seal eliminating cyclic seal loading and consequent oil leakage. The continuous connection of the inlet port with the rotor cavity between the gas seals and the oil seal maintains the pressure drop across the oil seal substantially constant permitting use of a single oil seal by preventing it from being subjected to the cyclic loading resulting from the usual closing off of the inlet port as normally occurs while the rotor eccentrically rotates within the engine housing.

3 Claims, 2 Drawing Figures

ROTARY COMBUSTION ENGINE OIL SEAL

This invention relates to a rotary combustion engine oil seal design arrangement and more specifically to such an arrangement wherein the rotor cavity between the gas seals and the oil seal on the rotor side face is continuously connected to inlet pressure maintaining a constant pressure drop across the oil seal.

In a rotary combustion engine, it sometimes becomes desirable to utilize a side inlet port for supplying a combustible mixture of air and fuel to the engine working chambers for compression and subsequent ignition. The placement of the inlet ports in engine end housing members frequently becomes desirable from the standpoint of space in an engine compartment or as a result of the necessity of producing a required amount of turbulence in the combustion chamber to obtain maximum combustion. The particular geometry of the engine including location of the inlet port is significant with respect to stratification and desired turbulence to insure complete combustion of the mixture compressed in the engine working chambers as the rotor rotates within the usual two lobed trochoidal engine housing chamber. It is for these reasons a side inlet port is used to obtain maximum operating efficiency of the engine while also retaining the hydrocarbon and nitrous oxide omissions at a minimum.

In a rotary engine having a triangularly shaped rotor, the rotor has side mounted gas seals contained in grooves adjacent each peripheral surface and has a radially inwardly positioned circular oil seal groove on a center with the rotor center containing an oil seal assembly. Oil is supplied to the radially inward side of the circular oil seal assembly for lubrication of the phasing gears and supporting bearing structures. Since the rotor does not rotate in a uniform circular path while planetating relative to the crankshaft within the two-lobed trochoidal chamber so as to maintain its three apices in constant sealed engagement with the inner peripheral surface of the rotor housing, a side inlet port is periodically in communication with the cavity formed between the gas seals and the circular oil seal on the rotor side face. The cavity is axially defined by the rotor face on one side and by an end housing wall on the opposite side. As a result of opening and closing of this cavity to the side inlet port, the pressure drop across the oil seal is cyclic such that a maximum pressure drop exists when the cavity is in communication with the side inlet port during which time the outer surface of the oil seal is subjected to inlet pressure below atmospheric while the inner surface is constantly subjected to the positive oil sump pressure. The closing off of the inlet port results in the pressure on the exterior of the seal increasing to sump pressure or greater as a result of any oil leakage through the oil seal or gas leakage through the side compression seal so that the pressure drop across the oil seal is substantially zero or of reverse sense. The closing and opening of the cavity to the inlet port cyclically loads the seal increasing the possibility of oil leakage. In the event there is leakage across the oil seal a situation is created wherein it is likely that excessive leakage across the seal will occur as the maximum pressure drop across the seal is again reestablished when the cavity is again fluid connected with the side inlet port. Present rotary engine structures solve this problem by using two serially positioned oil seal assemblies wherein at least one of the seals is effective throughout each complete revolution of the rotor.

The improved rotary combustion engine oil seal design of the present invention overcomes this problem and permits use of only one oil seal assembly by providing a means for maintaining the cavity between the gas seals and the circular oil seal constantly in communication with intake vacuum. This is accomplished even though the area of the cavity between these two seals varies substantially in magnitude as the rotor planetates upon the fixed phasing gear relative to the crankshaft. The cavity is continuously connected with intake vacuum by a vent groove extending away from the leading edge of the side inlet port in a direction opposite to that of the rotation of the rotor so that it is placed in a position continuously extending into the cavity between the aforementioned zeals thereby assuring a constant pressure drop across the circular oil seal assembly.

Venting the rotor side face cavity in accordance with my invention eliminates one oil seal assembly and its associated manufacturing costs; reduces engine frictin created by the second oil seal; reduces side loading on the rotor side face; permits a reduction of rotor end clearance reducing emissions; improves performance by use of a larger intake port; and reduces cyclic loading on the single oil seal improving its durability.

It is therefore a general object of the present invention to provide an improved rotary internal combustion engine oil seal design wherein cyclic pressure differentials across the seal are eliminated permitting use of only one oil seal assembly.

A more particular object of the present invention is to provide an improved rotary internal combustion engine oil seal design in which the engine intake pressure, supplied through a housing side port, is constantly connected with a rotor side face cavity maintaining inlet pressure on the radially outward side of a circular oil seal thereby eliminating undesirable cyclic pressure changes across the oil seal assembly.

Another object of the present invention is the provision of a side inlet port in an engine housing member having a portion thereof in constant fluid connection with a cavity defined by rotor mounted gas seals and a circular oil seal mounted radially inwardly from the gas seals cooperating with a rotor side face and an engine housing end wall defining a cavity having varying area between the respective seals, the cavity constantly receiving intake manifold pressure thereby maintaining a constant pressure on the radial outward side of the circular oil seal assembly.

A still further object of the present invention is the provision of a vent groove extending from the leading edge of a side inlet port in the face of a housing end wall fluid connecting a cavity between the gas seals and a circular oil seal in a rotor side face with intake pressures thereby maintaining a continuous inlet pressure on the radially outward side of the oil seal while the radially inward side of the seal is simultaneously subjected to oil sump pressure preventing the seal assembly from being cyclically loaded during engine operation.

The novel features which I believe to be characteristic of my invention are set forth with particularity in the appended claims. My invention, however, both as to its organization and method of operation, together with further objects and advantages thereof, will best be understood by reference to the following description taken in connection with the accompanying drawings in which:

Figure 1:
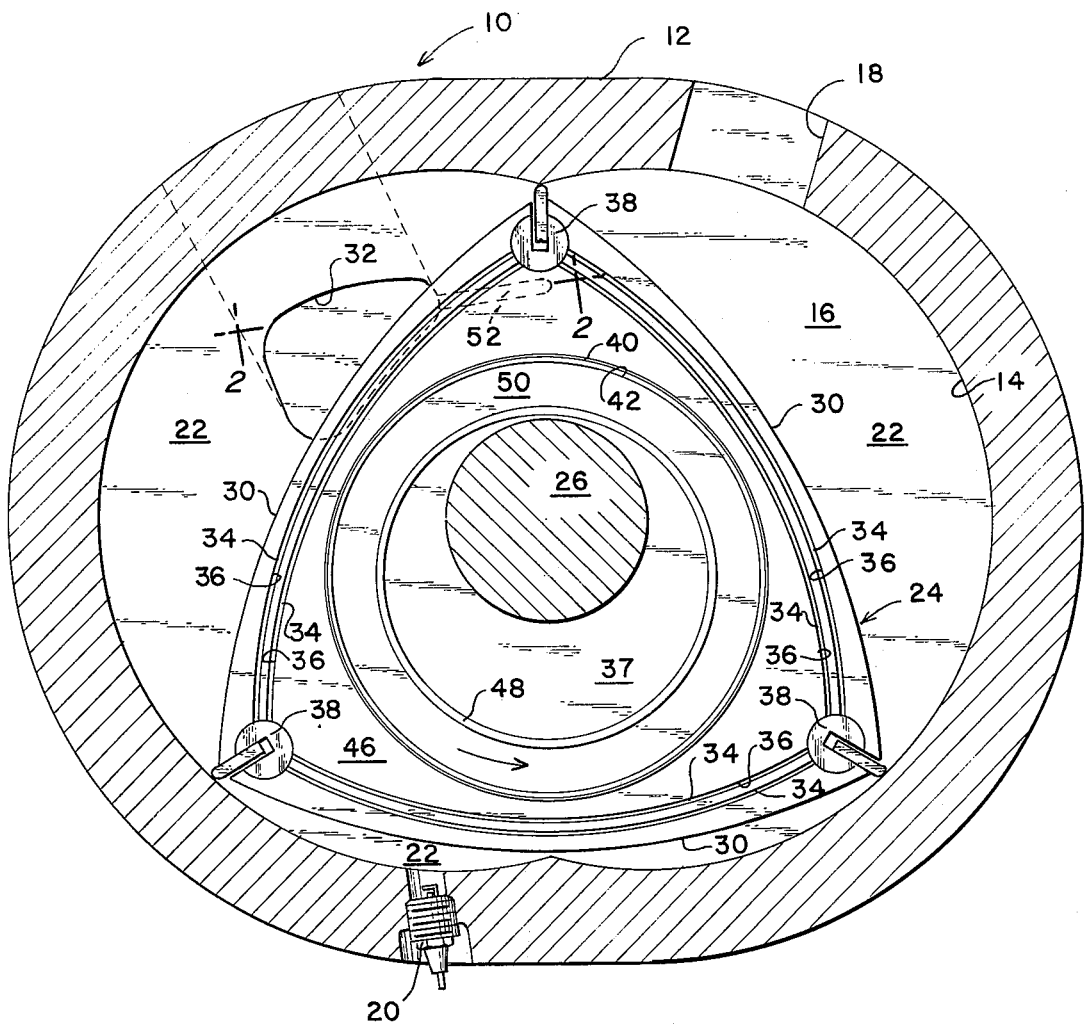
FIG. 1 is a side elevational view, partly in section, illustrating a rotary internal combustion engine having a side inlet port being provided with an improved oil seal design in accordance with the subject invention.

With reference to FIG. 1, a rotary internal combustion engine incorporating features of the present invention comprises a housing assembly 10 including a central peripheral housing member 12 defining a two-lobed trochoidal cavity defined by an inner peripheral surface 14 which is enclosed by housing end walls on either side thereof, only one housing end wall 16 being shown. The central peripheral housing member 12 contains an exhaust passage 18 and has a spark plug 20 located at a predetermined position for maximum combustion of a combustible mixture supplied in a fluid compressed working chamber 22. The working chambers 22 assume various volumes as a rotor 24 planetates relative to a crankshaft 26. The inner peripheral surface 14 of central housing member 12 defines the aforementioned two-lobed trochoidal cavity which in conjunction with rotor peripheral surfaces 30 cooperate to define the varying volume working chambers 22 moving with the rotor as it rotates so that desired intake, compression, combustion and expansion cycles are developed during each revolution of the rotor 24. A side inlet port 32 is provided in the end housing wall 16 so that a particular working chamber 22 in communication with the side inlet port 32 receives a combustible air-fuel mixture for compression, ignition and expansion thereof as the rotor 24 rotates in a counter clockwise direction as viewed in FIG. 1.

The rotor 24 is generally triangularly shaped including the three peripheral surfaces 30. Gas seal assemblies 34 are mounted in respective grooves 36 in rotor side face 37 adjacent the peripheral surfaces 30. The respective seal assemblies 34 connect with a corner seal assembly 38 at each apex of the triangularly shaped rotor 24 so as to provide a complete gas seal around the entire periphery of the rotor.

The rotor 24 also includes a circular oil assembly 40 mounted in a mating circular oil groove 42 also machined in side face 37 of the rotor 24. The rotor 24 has the aforementioned gas seal assemblies 34 and circular oil seal assembly 40 mounted on each of its opposite side faces 37. The rotor side face 37 adjacent inlet port 32 normally defines a cavity 46 varying in area as it progresses around the rotor surface, the cavity 46 having a greater area in the vicinity of the rotor apexes as shown in FIG. 1. In the usual rotary internal combustion engine configuration, side inlet port 32 is positioned such that the cavity 46 is alternately connected with the side inlet port 32 and alternately closed therefrom as rotor 24 planetates relative to crankshaft 26 upon the engaged facing gears shown schematically at 48. Since the area 50 on the rotor side face radially inwardly of the oil seal assembly 40 is constantly subjected to oil sump pressure for proper lubrication of the engaged phasing gears and bearings mounting the relatively rotatable components of the engine assembly and since the inlet port 32 is alternately closed and opened to the cavity 46, the oil seal assembly 40 is subjected to cyclic pressure differentials. In the event any leakage across the oil seal assembly occurs, the closing off of inlet port 32 results in a substantially zero pressure drop across the oil seal assembly 40. A subsequent connection of the cavity 46 with the inlet port 32 then subjects the oil seal assembly to a maximum pressure drop creating a situation wherein excessive oil leakage into the cavity 46 is likely to occur.

The subject invention overcomes this difficulty by placing the side inlet port in a position so that a portion thereof is in constant communication with the cavity 46 so that the radially outward side of the seal assembly 40 is constantly subjected to intake manifold pressure thereby maintaining a constant pressure drop across the assembly. This eliminates the cyclic loading on the seal assembly and provides for a more positive and endurable oil seal assembly.

The constant pressure drop across the oil seal assembly 40 is provided, in preferred form, by milling a vent groove 52 in the end wall 16 so that it extends away from the leading edge of inlet port 32 in a position insuring constant connection of inlet port 32 with cavity 46 on rotor side face 37. In a specific embodiment, the vent groove 52 was 0.188 inches in width and was .100 inches deep being arcuate in form to provide the desired connection. Since the vent groove 52 is of relatively small dimension, it has minimal effect on the wear of the gas seal assemblies 34 as they move thereacross during rotation of the rotor assembly 24.

Data obtained from engines operating with two oil seals without the aforementioned vent slot 52 or the positioning of the inlet port 32 to constantly connect with cavity 46 indicate that the fluctuation of pressures in the cavity 46 were as high as 17 psi peak pressures from intake pressure upwardly. Test data obtained from an engine operating with the slot milled in housing end wall 16 constantly connecting the cavity 46 with intake manifold pressures and with a single oil seal developed fluctuations of only 0.2 psi peak oscillation from intake pressure upwardly thereby verifying a substantially constant pressure drop across the oil seal assembly during engine operation so as to prevent cyclic seal loading and excessive oil losses.

Figure 2:
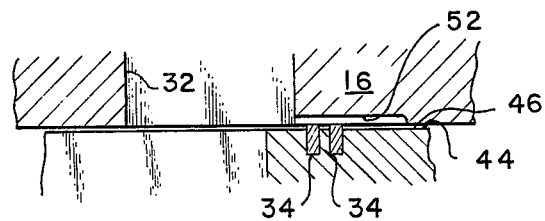
FIG. 2 is a fragmentary sectional view taken on line 2—2 of FIG. 1.

The vent groove 52 is best illustrated in FIG. 2 wherein it extends past the usual dual gas seal assemblies 34 to connect with the cavity 46 between end wall 16 and the rotor side face 37 as previously described. Of course, the vent groove 52 could assume any form sufficient to provide the constant connection between the inlet port 32 and the cavity 46.

While I have shown and described the particular embodiment of my invention it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. A rotary engine having a relatively constant pressure drop across a rotor side face mounted oil seal assembly comprising a housing with an inwardly facing peripheral wall and oppositely facing inner end walls cooperatively defining a cavity, a crankshaft rotatably supported in said housing, said crankshaft having an eccentric located in said cavity, a rotor rotatably mounted on said eccentric, said rotor having side faces facing said side walls and peripheral faces facing said peripheral wall defining a plurality of chambers spaced about and moving with said rotor while varying in volume as said rotor rotates, a single annular oil seal groove in each side face of said rotor with its center on the rotor axis, an oil seal assembly positioned in each of said annular grooves and being biased into continual engagement with respective said housing end walls, gas seal grooves formed adjacent the periphery of said rotor, gas seal assemblies mounted in each of said gas seal grooves and being continually biased into engagement with respective said housing end walls, said gas seals and said annular oil seal cooperatively defining a cavity therebetween on said rotor side faces, the improvement comprising; an intake port being provided in said housing with a predetermined portion of said intake port being in continuous fluid connection with said cavity defined between said gas seals and said oil seal such that the radially outward side of said oil seal assembly is constantly subjected to intake pressure thereby continually maintaining a pressure drop across said oil seal preventing it from being subjected to significant fluctuations in pressure drop thereacross permitting use of a single oil seal assembly.

2. A rotary engine having a relatively constant pressure drop across rotor side face mounted oil seal assemblies comprising a housing with an inwardly facing peripheral wall and oppositely facing inner end walls cooperatively defining a cavity, a crankshaft rotatably supported in said housing, said crankshaft having an eccentric located in said cavity, a rotor rotatably mounted on said eccentric, said rotor having side faces facing said end walls and peripheral faces facing said peripheral walls defining a plurality of chambers spaced about and moving with said rotor while varying in volume as said rotor rotates, a single annular oil seal groove in each side face of said rotor with its center on the rotor axis, an oil seal assembly positioned in each of said annular grooves and being biased into continual engagement with respective said housing end walls, gas seal grooves formed adjacent the periphery of said rotor on each rotor side face, gas seal assemblies mounted in each of said gas seal grooves and being continually biased into engagement with respective said housing end walls, said gas seals and said annular oil seal cooperatively defining a cavity axially between said rotor side faces and said housing end walls and radially between said oil seal assembly and said gas seal assemblies, the improvement comprising: a side intake port being provided in each of said housing end walls, and a vent groove formed in each of said housing end walls continually connecting said cavity between said seal assemblies with said intake ports while said rotor planetates about said crankshaft within said housing whereby the oil seal assemblies are subjected to a relatively constant pressure drop thereacross by virtue of oil sump pressure being applied on the radially inward side thereof while intake pressure is continually applied to the radially outward side thereof thereby preventing cyclic loading of said oil seal assemblies.

3. A rotary engine having a relatively constant pressure drop across oil seal assemblies mounted on engine intake rotor side faces comprising; a housing with an inwardly facing peripheral wall and oppositely facing inner end walls cooperatively defining a cavity, a crankshaft rotatably supported in said housing, said crankshaft having an eccentric located in said cavity, a rotor rotatably mounted on said eccentric, said rotor having side faces facing said end walls and peripheral faces facing said peripheral wall defining a plurality of chambers spaced about and moving with said rotor while varying in volume as said rotor rotates, a single annular oil seal groove in each side face of said rotor with its center on the rotor axis, an oil seal assembly positioned in each of said annular grooves and being biased into continual engagement with respective said housing end walls, gas seal grooves formed adjacent the periphery of said rotor in each side face, gas seal assemblies mounted in each of said gas seal grooves and being continually biased into engagement with respective of said housing end walls, said gas seals and said annular oil seal cooperatively defining a cavity on each of said rotor side faces between said seals and said housing end walls, the improvement comprising; a side intake port being provided in each of said housing end walls, a vent groove formed in each said housing end walls connecting with said side intake ports and projecting from the leading edge of each of said inlet ports a sufficient distance along said housing side wall so as to be in constant connection with said cavity thereby continually applying intake pressure on the radially outward side of said oil seal assemblies while the sump pressure is being continually applied on the radially inward side of said oil seal assemblies thereby maintaining a pressure drop across said seal assemblies and eliminating cyclic loading thereof.

* * * * *